2,794,025

PROCESS OF RESOLVING AMINO ACIDS OF THE PROLINE TYPE

Gaston Amiard, Noisy-le-Sec, René Heymes, Romainville, and Léon Velluz, Paris, France, assignors to UCLAF, Paris, France, a body corporate of France No Drawing. Application March 25, 1955, Serial No. 496,952

Claims priority, application France March 29, 1954

9 Claims. (Cl. 260—326.3)

The present invention relates to a process of resolving amino acids of the proline type and more particularly to a process of resolving DL-proline and DL-hydroxy proline into their optically active components, and to new and valuable optically active salts of said proline and hydroxy proline.

Proline and hydroxy proline correspond to the following formula

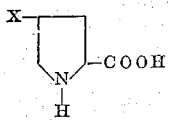

wherein X is hydrogen or the hydroxyl group.

Proline is one of the amino acids which, in its levorotatory form, i. e. as L-proline, plays an important role as glucogenic compound in the animal metabolism. Like other amino acids, proline, in its D- and L-forms, is a component of various polypeptides. In its D-form it is found in polypeptides present in the ergot of rye and in its L-form in gramicidine, A. C. T. H., oxytocin, and others and is useful in the synthesis of such compounds according to known methods.

Synthetic methods of producing said amino acids proline and hydroxy proline usually yield the racemic mixture of the two optically active forms of said amino acids. To further utilize said amino acids, said racemic mixture must be resolved into its optically active components.

The only method heretofore described in the literature for resolving DL-proline makes use of the cinchonine salt of N-m-nitro benzoyl proline as an intermediate in the resolving procedure. The yield obtained when proceeding according to said known method does not exceed 40%. Furthermore, this process requires subsequent saponification of the N-m-nitro benzoyl derivatives of the resulting D- and L-prolines. On such saponification, however, partial reracemization takes place so that the D- and L-proline obtained thereby must further be purified, for instance, by means of their metal salts.

The same difficulties arise when resolving hydroxy proline in a similar manner.

A process of resolving DL-hydroxy proline by means of the quinine salt of N-phenyl isocyanate of DL-hydroxy proline has been suggested heretofore. The yield of the optically active compounds obtained thereby, however, does not exceed 30%.

It is one object of the present invention to overcome the disadvantages encountered heretofore in resolving DL-proline and DL-hydroxy proline and to provide a simple and effective resolving process thereby producing the D- and the L-forms in a remarkably good yield and purity.

Another object of the present invention is to provide new and valuable derivatives of D- and L-proline and hydroxy proline which derivatives are useful as intermediates in the resolution of said amino acids by the process according to the present invention.

Other objects of the present invention and advantageous features thereof will become apparent as the description proceeds.

In principle, the process according to the present invention involves first the conversion of racemic proline or hydroxy proline into their N-3,5-dinitro benzoyl derivatives corresponding to the following formula

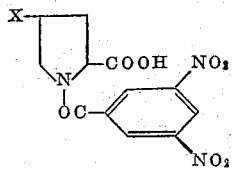

wherein X is hydrogen or the hydroxyl group. The resulting N-3,5-dinitro benzoyl-DL-proline or DL-hydroxy proline are then resolved by adding to their aqueous solution or their solution in a suitable organic solvent, such as ethanol or dioxane, D(—)- or L(+)-threo-(1-p-nitro phenyl)-2-amino propanediol-(1,3). Thereby salts of the D- or L-forms of the amino acids with the D(—)- or L(+)-threo-(1-p-nitro phenyl)-2-amino propanediol-(1,3) compounds are formed. These salts are characterized by their different solubility in water and certain organic solvents permitting their separation from each other.

The less soluble salt of the two enantiomorphic components of N-3,5-dinitro benzoyl-DL-proline or DL-hydroxy proline which precipitates from the reaction mixture is separated, for instance, by filtration or centrifuging from the more soluble salt which remains in solution in the mother liquor. The resulting salts are decomposed by reaction with an alkaline agent to set free the N-3,5-dinitro benzoyl-D- or L-proline or D- or L-hydroxy proline. By acidifying the alkali metal salts of said N-acylated amino acids obtained thereby, the free acids are obtained from which the dinitro benzoyl group is split off by hydrolysis to regenerate the respective optically active free amino acid.

For instance, when adding L(+)-threo-(1-p-nitro phenyl)-2-amino propanediol-(1,3) to an aqueous solution of N-3,5-dinitro benzoyl-DL-proline or a solution of said compound in a suitable organic solvent such as ethanol, the salt of said L(+)-threo-1-(p-nitro phenyl)-2-amino propanedio-(1,3) with N-3,5-dinitro benzoyl-D-proline precipitates due to its very low solubility in water and such organic solvents while the corresponding salt of N-3,5-dinitro benzoyl-L-proline remains completely in solution. The precipitated salt of L(+)-threo-(1-p-nitro phenyl)-2-amino propanediol-(1,3) with N-3,5-dinitro benzoyl-D-proline is then separated from the mother liquor. Said salt is in a comparatively pure state and substantially free of the salt formed with N-3,5-dinitro benzoyl-L-proline which remains in solution in the mother liquor. It is then converted by reaction with an alkaline agent into the alkali metal salt of N-3,5-dinitro benzoyl-D-proline. N-3,5-dinitro benzoyl-D-proline is obtained from its alkali metal salt by acidifying its solution. Hydrolysis of said N-acylated amino acid yields D-proline.

Use of the N-3,5-dinitro benzoyl compounds of D- or L-proline in this resolving procedure has the great advantage that hydrolysis of the N-acylated amino acids to the corresponding D- or L-proline, respectively, can be effected without substantial racemization.

The mother liquors remaining after precipitation and separation of the L(+)-threo-(1-p-nitro phenyl)-2-amino propanediol-(1,3) salt of N-3,5-dinitro benzoyl-D-proline are worked up in a similar manner and yield N-3,5-dinitro benzoyl-L-proline which often is contaminated by small amounts of the racemic acylated material. In general, it is sufficient to subject said impure L-proline compound to repeated recrystallization from appropriate solvents in order to purify the same. In cases where more thorough purification is required, the impure compound is treated with D(—)-threo-1-p-nitro phenyl-2-amino propanediol-(1,3) which, in contrast to its L-enantiomorphic compound, yields a salt of low solubility with N-3,5-dinitro benzoyl-L-proline. Said salt crystallizes while the corresponding salt formed with N-3,5-dinitro benzoyl-D-proline remains in solution. By treating the difficulty soluble salt with the L-proline compound with an alkaline agent and subsequently acidifying the resulting alkali metal and hydrolyzing the N-acylated amino acid, it is readily converted into pure L-proline without any substantial racemization taking place.

The N-3,5-dinitro benzoyl-L-proline can be returned into the resolving process after reconversion into the corresponding N-3,5-dinitro benzoyl-DL-proline according to known processes. Or, said N-3,5-dinitro benzoyl-L-proline is first hydrolyzed to L-proline which can readily be racemized, for instance, by heating at 140–145° C. in the presence of baryta water. By such repeated resolving and racemization procedures it is readily possible to completely transform all the L-proline originally present in the DL-proline starting material into the D-form. It is understood, of course, that in the same manner all the D-proline present in said DL-proline starting material can be converted into the L-form.

On setting free the N-3,5-dinitro benzoyl-D- or L-proline or hydroxy proline from their salts with D(—)- or L(+)-threo-1-(p-nitro phenyl)-2-amino propane-diol-(1,3) by the action of an alkaline agent, more than 90% of said resolving agent can be recovered and again used for resolving.

When applying this new resolving process to DL-hydroxy proline, there are formed, in contrast to DL-proline, salts of low solubility by reaction of N-3,5-dinitro benzoyl-D-hydroxy proline with D(—)-threo-1-(p-nitro phenyl)-2-amino propanediol-(1,3) or by reaction of N-3,5-dinitro benzoyl-L-hydroxy proline with L(+)-threo-1-(p-nitro phenyl)-2-amino propanediol-(1,3) while the salts of the D(—)-form of the amino propanediol compound with the N-acylated L-hydroxy proline and of the L(+)-form of the amino propanediol compound with the N-acylated D-hydroxy proline are readily soluble and remain in solution. By treating the difficultly soluble and precipitated salt with an alkaline agent, recovering the resolving agent, and then acidifying the alkali metal salts of N-3,5-dinitro benzoyl-D- or L-hydroxy proline, said N-acylated amino acids are obtained which, on hydrolysis, yield substantially pure D- or L-hydroxy proline, respectively. Thereby, like with the corresponding proline compounds, substantially no racemization takes place.

N-3,5-dinitro benzoyl-DL-proline or DL-hydroxyproline are readily obtainable, for instance, by reacting DL-proline or DL-hydroxy proline with 3,5-dinitro benzoyl chloride. The yield thereby is, according to the Schotten-Baumann reaction, almost quantitative. It is also possible to react 3,5-dinitro benzoylchloride with an ester or another acid derivative of DL-proline or DL-hydroxy proline provided that the ester or other acid derivative employed permits ready regeneration of the N-acylated amino acid.

It is a characteristic feature of the present invention that other N-acyl derivatives of DL-proline and DL-hydroxy proline, such as N-formyl, N-acetyl or N-m-nitro benzoyl-DL-proline or -DL-hydroxy proline, than the N-3,5-dinitro benzoyl derivatives are not suitable for the purpose of the present invention because they either do not form difficultly soluble salts with the one or the other optically active compound of said amino acids or they give rise, on subsequent hydrolysis, to re-racemization.

The D(—)- or L(+)-threo-1-(p-nitro phenyl)-2-amino propanediols-(1,3) used as resolving agents for salt formation with the optically active components of N-3,5-dinitro benzoyl-DL-proline or N-3,5-dinitro benzoyl-DL-hydroxy proline are obtained in the course of the synthesis of chloramphenicol and preferably by the resolving process disclosed by Velluz, Amiard, and Joly in the Bull. Soc. Chim. 1953, page 342.

The resolving process according to the present invention has the particular advantage that use is made of the valueless L(+)-threo-(1-p-nitro phenyl)-2-amino-propanediol-(1,3) which is obtained as a by-product in the chloramphenicol synthesis.

L(+)-threo-1-(p-nitro phenyl)-2-amino propanediol-(1,3) has a melting point of 162–163° C. and a rotatory power $[\alpha]_D = 28° \pm 2°$ (concentration: 2% in 0.1 N hydrochloric acid).

D(—)-threo-1-(p-nitro phenyl)-2-amino propanediol-(1,3) has a rotatory power $[\alpha]_D = -28° \pm 2°$ (concentration: 2% in 0.1 N hydrochloric acid). F=162–163°.

Both compounds correspond to the following formula

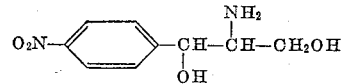

The yield obtained on resolving DL-proline is between about 80% and about 90% while, for instance, N-3,5-dinitro benzoyl-L-hydroxy proline is obtainable in a yield of about 90%. These yields are twice to three times as high as the yields obtained heretofore.

The following examples serve to illustrate the present invention without, however, limiting the same thereto.

EXAMPLE 1

*Preparation of N-3,5-dinitro benzoyl-DL-proline*

2.7 g. of DL-proline are dissolved in 52 cc. of an N aqueous sodium hydroxide solution. The solution is cooled to 0° C. 6.25 g. of 3,5-dinitro benzoylchloride are added to said solution. The reaction mixture is removed from the cooling bath and is agitated at room temperature for 15 minutes. After filtering off sodium chloride, 5 cc. of concentrated hydrochloric acid are added. 6.8 g. of N-3,5-dinitro benzoyl-DL-proline melting at 221–222° C. are obtained thereby. The yield amounts to 95% of the theoretical yield.

EXAMPLE 2

*Resolving N-3,5-dinitro benzoyl-DL-proline by means of L(+)-threo-1-(p-nitro phenyl)-2-amino propanediol-(1,3) and separation of D- and L-proline*

(a) FORMATION OF THE SALT OF N-3,5-DINITRO BENZOYL-D-PROLINE WITH L(+)-THREO-1-(P-NITRO PHENYL)-2-AMINO PROPANEDIOL-(1,3)

5 g. of N-3,5-dinitro benzoyl-DL-proline are dissolved at about 70° C. in 25 cc. of water. A.75 g. of L(+)-threo-1-(p-nitro phenyl)-2-amino propanediol-(1,3) are added to said solution. The mixture is cooled to 40° C. within 30 minutes while stirring. The precipitated salt is filtered off and washed with a small amount of water. On recrystallization from water and drying in a drying oven at 60° C. the hydrated salt is obtained. Said salt melts at about 100° C. and has a rotatory power $[\alpha]_D^{20} = +73° \pm 1°$ (concentration: 0.5% in 50% ethanol). The yield is 3.5 g. corresponding to 85% of the theoretical yield.

(b) PREPARATION OF N-3,5-DINITRO BENZOYL-D-PROLINE 3.5 g. of said salt of N-3,5-dinitro dibenzoyl-D-proline with L(+)-threo-1-(p-nitro phenyl)-2-amino propanediol-(1,3) are treated at 40° C. with 7 cc. of N sodium hydroxide solution. The salt first dissolves and thereafter L(+)-threo-1-(p-nitro phenyl) - 2 - amino propanediol-(1,3) starts to crystallize. The crystals are filtered off and washed with a small amount of water. In this manner 1.4 g. of the resolving agent, corresponding to 37% of the theoretical yield, are recovered.

The resulting filtrate is acidified with 0.7 cc. of concentrated hydrochloric acid. N-3,5-dinitro benzoyl-D-proline crystallizes and is filtered off, washed with a small amount of water, and dried. In this manner 2.01 g. of crystalline N-3,5-dinitro benzoyl-D-proline are obtained. Its melting point is 179–180° C., its rotatory power $[\alpha]_D^{20} = +92° \pm 1°$ (concentration: 0.5% in 50% ethanol). The yield amounts to 80% calculated for N-3,5-dinitro benzoyl-DL-proline used as starting material.

(c) ISOLATION OF D-PROLINE

A solution of 1 g. of N-3,5-dinitro benzoyl-D-proline is heated under reflux in 10 cc. of 5 N hydrochloric acid during 30 minutes. The resulting solution is then filtered, evaporated to dryness in a vacuum, and the resulting hydrochloride of D-proline is recrystallized from acetone. The product is dissolved in 10 cc. of water and is treated with 2 g. of Amberlite IR4B for one hour. The mixture is filtered and the filtrate is evaporated to dryness in a vacuum. 300 mg. of crystalline D-proline, corresponding to a yield of 80% of the theoretical yield, and having a rotary power of $[\alpha]_D^{20} = +83.5° \pm 2°$ (concentration: 0.5% in water) are obtained thereby.

(d) ISOLATION OF L-PROLINE

The aqueous filtrate, obtained after removing the crystallized salt of N-3,5-dinitro benzoyl-D-proline with L(+)-threo-1-(p-nitro phenyl) - 2 - amino propanediol-(1,3), is treated with 1 cc. of sodium hydroxide solution. Thereby 2.1 g. of the resolving agent, corresponding to a yield of 56%, are recovered as described hereinabove under (b). 1 cc. of concentrated hydrochloric acid is added to the filtrate, thereby yielding 2.7 g. of impure N-3,5-dinitro benzoyl-L-proline. Said compound can be purified by recrystallization according to conventional methods or by means of its ability of forming a difficultly soluble salt with D(−)-threo-1-(p-nitro phenyl)-2-amino propanediol-(1,3) as this will be described hereinafter in Example 3.

The product which can be recovered from the mother liquors of the recrystallization of N-3,5-dinitro benzoyl-L-proline can be added to a new charge of racemic mixture to be resolved.

L-proline is obtained from its N-acyl compound in the same manner as described hereinabove under (c) for D-proline, by hydrolyzing N-3,5-dinitro benzoyl-L-proline by means of hydrochloric acid.

EXAMPLE 3

Purification of N-3,5-dinitro benzoyl-L-proline by means of D(−)-threo-1-(p-nitro-phenyl)-2-amino propanediol-(1,3)

2.8 g. of impure N-3,5-dinitro benzoyl-L-proline obtained according to Example 2 (d), are treated with 2 g. of D(−)-threo-1-(p-nitro phenyl)-2-amino propanediol-(1,3) in 14 cc. of water at a temperature of 40° C. Thereby, 3.9 g. of the hydrated salt of N-3,5-dinitro benzoyl-L-proline with D(−)-threo-1-(p-nitro phenyl)-2-amino propanediol-(1,3) are obtained. Said salt has a melting point of 100° C. and a rotatory power $[\alpha]_D^{20} = -73° \pm 1°$ (concentration: 0.5% in 50% ethanol). After treating said salt with alkali hydroxide, separating the resolving agent, and acidifying the filtrate as described hereinabove in Example 2 under (b), there are obtained 2.1 g. of pure N-3,5-dinitro benzoyl-L-proline having a melting point of 179–180° C. and a rotatory power $[\alpha]_D^{20} = -92° \pm 1°$ (concentration: 0.5% in 50% ethanol).

EXAMPLE 4

Preparation of N-3,5-dinitro benzoyl-DL-hydroxy proline 10 g. of DL-hydroxy proline are dissolved in 200 cc. of N sodium hydroxide solution. The solution is cooled to 0° C. 22 g. of freshly pulverized 3,5-dinitro benzoyl chloride are added thereto within one minute while stirring vigorously. The mixture is removed from the cooling bath and is agitated at room temperature for 15 minutes. Sodium chloride is filtered off, the filtrate is heated to 50° C., and 22 cc. of concentrated hydrochloric acid are added thereto. On cooling, 24 g. of N-3,5-dinitro benzoyl-DL-hydroxy proline having a melting point of 205–207° C. are obtained. The yield amounts to 96% of the theoretical yield.

EXAMPLE 5

Resolving of N-3,5-dinitro benzoyl-DL-hydroxy proline and preparation of D- and L-hydroxy proline (a) FORMATION OF THE SALT OF N-3,5-DINITRO BENZOYL-L-HYDROXY PROLINE WITH L(+)-THREO-1-(P-NITRO PHENYL)-2-AMINO PROPANEDIOL-(1,3)

20 g. of N-3,5-dinitro benzoyl-DL-hydroxy proline are dissolved at a temperature of 80° C. in 160 cc. of dioxane containing 5% of water. 13.5 g. of L(+)-threo-1-(p-nitro phenyl)-2-amino propanediol-(1,3) are added to said solution. The mixture is cooled to 25° while stirring. The precipitated salt is filtered off, and twice washed, each time with 10 cc. of dioxane containing 5% of water. The resulting hydrated salt melts at 140–141° C. and has a rotatory power $[\alpha]_D^{20} = -78° \pm 2°$ (concentration: 1% in water). The yield of the dry compound amounts to 14.7 g. corresponding to 89% of the theoretical yield.

(b) PREPARATION OF N-3,5-DINITRO BENZOYL-L-HYDROXY PROLINE 14.7 g. of the salt of N-3,5-dinitro benzoyl-L-hydroxy proline with L(+)-threo-1-(p-nitro phenyl)-2-amino propanediol-(1,3) obtained as described above under (a), are treated with 32 cc. of N sodium hydroxide solution. The salt first dissolves and thereafter crystallization of L(+)-threo-1-(p-nitro phenyl)-2-amino propanediol-(1,3) sets in. The precipated base is filtered off and washed with a small amount of water. 4.8 g. of the resolving agent, corresponding to a yield of 35.5% of the starting material, are recovered in this manner. The resulting filtrate is saturated with sodium chloride, acidified with 3.5 cc. of concentrated hydrochloric acid, and extracted four times, first with 15 cc., and subsequently with 10 cc., 5 cc., and 5 cc. of ethyl acetate. The extract is washed with a small amount of water, dried over magnesium sulfate, and evaporated to dryness. 8.3 g. of N-3,5-dinitro benzoyl-L-hydroxy proline are obtained thereby. Its rotatory power is $[\alpha]_D = -147° \pm 2°$ (concentration: 1% in 50% ethanol). The yield amounts to 83% calculated for N-3,5-dinitro benzoyl-DL-hydroxy proline used as starting material.

(c) ISOLATION OF L-HYDROXY PROLINE

A solution of 2.5 g. of N-3,5-dinitro benzoyl-L-hydroxy proline in 25 cc. of 5 N hydrochloric acid is heated under reflux for 40 minutes. After filtering, the solution is evaporated to dryness. The resulting hydrochloride of L-hydroxy proline is recrystallized from chloroform. The recrystallized amino acid is dissolved in one part by volume of water and first 0.7 cc. of aniline and then 12 cc. of boiling absolute ethanol are added. In this manner, after cooling the solution, 0.87 g. of crystalline L-hydroxy proline having a melting point of 273–274° C. and a rotatory power $[\alpha]_D^{20} = -77° \pm 1°$ (concentration: 1% in water) are obtained. The yield amounts to 87% of the theoretical yield.

(d) ISOLATION OF D-HYDROXY PROLINE

The aqueous filtrate obtained after filtering off the crystalline salt of N-3,5-dinitro benzoyl-L-hydroxy proline with L(+)-threo-1-(p-nitro phenyl)-2-amino propanediol-(1,3) is evaporated to dryness and the residue is dissolved in a small amount of water. The resulting concentrated aqueous solution is treated with 40 cc. of N sodium hydroxide solution. Thereby, 7.2 g. of the resolving agent, corresponding to a yield of 53%, are recovered as described hereinabove under (b). The filtrate obtained thereby is saturated with sodium chloride. 5 cc. of concentrated hydrochloric acid are added thereto and the acid mixture is extracted with ethyl acetate as described hereinabove under (b). The resulting extract is concentrated by evaporation to a volume of 20 cc. On cooling 1.5 g. of N-3,5-dinitro benzoyl-DL-hydroxy proline, corresponding to 7.5% of the starting material used, are recovered. They can again be added to a new charge of racemic mixture to be resolved. After filtering off said DL-hydroxy proline compound and evaporating the filtrate to dryness, 9.5 g. of N-3,5-dinitro benzoyl-D-hydroxy proline, corresponding to a yield of 95% calculated for N-3,5-dinitro benzoyl-DL-hydroxy proline used as starting material, are obtained. Said compound is amorphous and is contaminated by a small amount of the racemic mixture. Its rotatory power is $[\alpha]_D = +115° \pm 2°$ (concentration: 1% in 50% ethanol).

D-hydroxy proline is obtained therefrom by hydrolysis by means of hydrochloric acid in the same manner as described for the production of L-hydroxy proline hereinabove under (c).

EXAMPLE 6

*Purification of N-3,5-dinitro benzoyl-D-hydroxy proline by means of D(—)-threo-1-(p-nitro phenyl)-2-amino propanediol-(1,3)*

Impure N-3,5-dinitro benzoyl-D-hydroxy proline obtained according to Example 5(d), is treated with D(—)-threo-1-(p-nitro phenyl)-2-amino propanediol-(1,3), in the same manner as described hereinabove in Example 5(a) with respect to the salt formation of N-3,5-dinitro benzoyl-L-hydroxy proline with L(+)-threo-1-(p-nitro phenyl)-2-amino propanediol-(1,3). Thereby, the hydrated salt of N-3,5-dinitro benzoyl-D-hydroxy proline with said D(—)-threo-1-(p-nitro phenyl)-2-amino propane-diol-(1,3) is formed and precipitated. It has a melting point of 140–141° C. and a rotatory power $[\alpha]_D^{20} = +78° \pm 2°$ (concentration: 1% in water).

Said salt is converted, in the same manner as described hereinabove in Example 5b), into amorphous N-3,5-dinitro benzoyl-D-hydroxy proline having a rotary power $[\alpha]_D^{20} = +147° \pm 2°$ (concentration: 1% in 50% ethanol). By hydrolysis by means of hydrochloric acid as described hereinabove in Example 5(c), there is obtained therefrom optically pure D-hydroxy proline having a rotatory power $[\alpha]_D = +77° \pm 1°$ (concentration: 1% in water).

Although water is the preferred solvent for the resolving process according to the present invention, it is also possible to use other solvents provided the salt of one of the enantiomorphic components of N-3,5-dinitro benzoyl-DL-proline or DL-hydroxy proline is substantially insoluble therein while the salt of the other enantiomorphic components remains dissolved therein. Water miscible alcohols such as ethanol and aqueous solutions of such alcohols can also be used. Another preferred solvent is dioxane containing 5% of water.

The elevated temperature at which the optically active threo-1-(p-nitro phenyl)-2-amino propanediol-(1,3) is added to the solution of the racemic mixture is preferably between 70° C. and 80° C. and should not exceed about 100° C. The mixture of N-acylated DL-proline compound and optically active 2-amino propanediol-(1,3) compound is preferably cooled to a temperature between about room temperature and 40° C. and should not exceed about 50° C.

The concentration of N-acylated DL-proline and DL-hydroxy proline in the starting solution is preferably between about 12.5% and about 20%. Said concentration, of course, is dependent upon the solvent employed and optimum conditions can readily be ascertained for each solvent and each resolving component by simple preliminary experiments.

As alkaline agent for decomposing the salts of optically active N-3,5-dinitro benzoyl proline and hydroxy proline with optically active threo-1-(p-nitro phenyl)-2-amino propanediol-(1,3) and for recovering the resolving agent, there is preferably employed an alkali hydroxide solution.

Hydrolysis of optically active N-3,5-dinitro benzoyl proline and hydroxy proline is preferably effected by boiling under reflux with a mineral acid, such as 5 N hydrochloric acid.

Of course, many changes and variations in the preparation of the salts of optically active N-3,5-dinitro benzoyl proline or hydroxy proline with D(—)- or L(+)-threo-1-(p-nitro phenyl)-2-amino propanediol-(1,3), the solvents used, the reaction conditions, temperature, and duration, of the dissolution, crystallization, and cooling steps, the recovery of the precipitated and crystallized salts of the optically active components of the racemic starting material and their recrystallization and purification, the decomposition of said salts to produce optically active N-3,5-dinitro benzoyl proline and hydroxy proline compounds, the hydrolysis of said optically active compounds and the isolation of optically active proline and hydroxy proline, the recovery of the resolving agent, the reconversion of the undesired optically active proline and hydroxy proline into the corresponding racemic mixture, and the like, may be made by those skilled in the art in accordance with the principles set forth herein and in the claims annexed hereto.

L hydroxyproline, as proline, plays an important role as glucogenic compound in the animal metabolism. Hydroxyproline, in its D- and L-forms, is also found in various polypeptides.

We claim:

1. In a process of resolving a DL-proline compound of the formula

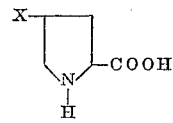

wherein X is a member selected from the group consisting of hydrogen and the hydroxyl group, the steps comprising adding an optically active threo-1-(p-nitro phenyl)-2-amino propanediol-(1,3) at elevated temperature not exceeding about 100° C. to a solution of an N-3,5-dinitro benzoyl-DL-proline compound of the formula

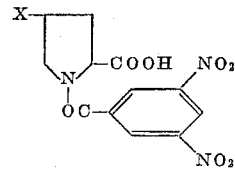

wherein X is a member selected from the group consisting of hydrogen and the hydroxyl group, in a solvent selected from the group consisting of water, a water miscible organic solvent, and mixtures thereof, cooling the resulting solution to crystallization temperatures not exceeding about 50° C., separating the precipitated salt of one of the optically active components of said N-3,5-dinitro benzoyl-DL-proline compound with said optically active threo-1-(p-nitro phenyl)-2-amino propanediol-(1,3) from the mother liquor, converting said precipitated salt by reaction with an alkaline agent into the alkali metal salt of said one of the optically active N-3,5-dinitro benzoyl proline compounds, acidifying said alkali metal salt, and hydrolyzing the resulting optically active N-3,5-dinitro benzoyl proline compound to the corresponding optically active proline compound.

2. In a process of producing D-proline by resolving

DL-proline, the steps comprising adding L(+)-threo-1-(p-nitro phenyl)-2-amino propanediol-(1,3) to an aqueous solution of N-3,5-dinitro benzoyl-DL-proline at elevated temperature not exceeding about 100° C., cooling the resulting solution to crystallization temperature not substantially exceeding about 50° C., separating the precipitated salt of N-3,5-dinitro benzoyl-D-proline with said L(+)-threo-1-(p-nitro phenyl)-2-amino propanediol-(1,3) from the mother liquor, converting said precipitated salt, by reaction with an alkaline agent, into the alkali metal salt of said N-3,5-dinitro benzoyl-D-proline, acidifying said alkali metal salt, and hydrolyzing the resulting N-3,5-dinitro benzoyl-D-proline to form D-proline.

3. In a process of producing L-proline by resolving DL-proline, the steps comprising adding D(—)-threo-1-(p-nitro phenyl)-2-amino propanediol-(1,3) to an aqueous solution of N-3,5-dinitro benzoyl-DL-proline at an elevated temperature not exceeding about 100° C., cooling the resulting solution to crystallization temperature not substantially exceeding about 50° C., separating the precipitated salt of N-3,5-dinitro benzoyl-L-proline with said D(—)-threo-1-(p-nitro phenyl)-2-amino propanediol-(1,3) from the mother liquor, converting said precipitated salt, by reaction with an alkaline agent, into the alkali metal salt of said N-3,5-dinitro benzoyl-L-proline, acidifying said alkali metal salt, and hydrolyzing the resulting N-3,5-dinitro benzoyl-L-proline to form L-proline.

4. In a process of producing D-proline by resolving DL-proline, the steps comprising adding D(—)-threo-1-(p-nitro phenyl)-2-amino propanediol-(1,3) to an aqueous solution of N-3,5-dinitro benzoyl-DL-proline at an elevated temperature not exceeding about 100° C., cooling the resulting solution to crystallization temperature not substantially exceeding about 50° C., separating the precipitated salt of N-3,5-dinitro benzoyl-L-proline with said D(—)-threo-1-(p-nitro phenyl)-2-amino propanediol-1,3) from the mother liquor, adding to said mother liquor an alkaline agent, removing the precipitated D(—)-threo-1-(p-nitro phenyl)-2-amino propanediol-(1,3) split off thereby, acidifying the remaining mother liquor, and hydrolyzing the resulting N-3,5-dinitro benzoyl-D-proline to form D-proline.

5. In a process of producing L-proline by resolving DL-proline, the steps comprising adding L(+)-threo-1-(p-nitro phenyl)-2-amino propanediol-(1,3) to an aqueous solution of N-3,5-dinitro benzoyl-DL-proline at an elevated temperature not exceeding about 100° C., cooling the resulting solution to crystallization temperature not substantially exceeding about 50° C., separating the precipitated salt of N-3,5-dinitro benzoyl-D-proline with said L(+)-threo-1-(p-nitro phenyl)-2-amino propanediol-(1,3) from the mother liquor, adding to said mother liquor an alkaline agent, removing the precipitated L(+)-threo-1-(p-nitro phenyl)-2-amino propanediol-(1,3) split off thereby, acidifying the remaining mother liquor, and hydrolyzing the resulting N-3,5-dinitro benzoyl-L-proline to form L-proline.

6. In a process of producing L-hydroxy proline by resolving DL-hydroxy proline, the steps comprising adding L(+)-threo-1-(p-nitro phenyl) - 2 - amino propanediol-(1,3) to a dioxane solution, containing about 5% of water, of N-3,5-dinitro benzoyl-DL-hydroxy proline at elevated temperature not substantially exceeding 100° C., cooling the resulting solution to crystallization temperature not substantially exceeding about 50° C., separating the precipitated salt of N-3,5-dinitro benzoyl-L-hydroxy proline with said L(+)-threo-1-(p-nitro phenyl)-2-amino propanediol-(1,3) from the mother liquor, converting said precipitated salt by reaction with an alkaline agent into the alkali metal salt of said N-3,5-dinitro benzoyl-L-hydroxy proline, acidifying said alkali metal salt, and hydrolyzing the resulting N-3,5-dinitro benzoyl-L-hydroxy proline to form L-hydroxy proline.

7. In a process of producing D-hydroxy proline by resolving DL-hydroxy proline, the steps comprising adding D(—)-threo-1-(p-nitro phenyl)-2-amino propanediol-(1,3) to a dioxane solution containing about 5% of water of N-3,5-dinitro benzoyl-DL-hydroxy proline at an elevated temperature not substantially exceeding 100° C., cooling the resulting solution to crystallization temperature not substantially exceeding about 50° C., separating the precipitated salt of N-3,5-dinitro benzoyl-D-hydroxy proline with said D(—)-threo-1-(p-nitro phenyl)-2-amino propanediol-(1,3) from the mother liquor, converting said precipitated salt by reaction with an alkaline agent into the alkali metal salt of said N-3,5-dinitro benzoyl-D-hydroxy proline, acidifying said alkali metal salt, and hydrolyzing the resulting N-3,5-dinitro benzoyl-D-hydroxy proline to form D-hydroxy proline.

8. In a process of producing D-hydroxy proline by resolving DL-hydroxy proline, the steps comprising adding L(+)-threo-1-(p-nitro phenyl)-2-amino propanediol-(1,3) to a dioxane solution, containing about 5% of water, of N-3,5-dinitro benzoyl-DL-hydroxy proline at an elevated temperature not substantially exceeding 100° C., cooling the resulting solution to crystallization temperature not substantially exceeding about 50° C., separating the precipitated salt of N-3,5-dinitro benzoyl-L-hydroxy proline with said L(+)-threo-1-(p-nitro phenyl)-2-amino propanediol-(1,3) from the mother liquor, adding to said mother liquor an alkaline agent, removing the precipitated L(+)-threo-1-(p-nitro phenyl)-2-amino propanediol-(1,3) split off thereby, acidifying the remaining mother liquor, and hydrolyzing the resulting N-3,5-dinitro benzoyl-D-hydroxy proline to form D-proline.

9. In a process of producing L-hydroxy proline by resolving DL-hydroxy proline, the steps comprising adding D(—)-threo-1-(p-nitro phenyl)-2-amino propanediol-(1,3) to a dioxane solution, containing about 5% of water, of N-3,5-dinitro benzoyl-DL-hydroxy proline at an elevated temperature not substantially exceeding 100° C., cooling the resulting solution to crystallization temperature not substantially exceeding about 50° C., separating the precipitated salt of N-3,5-dinitro benzoyl-D-hydroxy proline with said D(—)-threo-1-(p-nitro phenyl)-2-amino propanediol-(1,3) from the mother liquor, adding to said mother liquor an alkaline agent, removing the precipitated D(—)-threo-1-(p-nitro phenyl)-2-amino propanediol-(1,3) split off thereby, acidifying the remaining mother liquor, and hydrolyzing the resulting N-3,5-dinitro benzoyl-L-hydroxy proline to form L-proline.

References Cited in the file of this patent

UNITED STATES PATENTS

| | | |
|---|---|---|
| 2,483,885 | Crooks et al. | Oct. 4, 1949 |
| 2,514,376 | Crooks et al. | July 11, 1950 |
| 2,528,267 | Dearborn et al. | Oct. 31, 1950 |

OTHER REFERENCES

Jr. Org. Chem., vol. 15, pp. 24–34 (1950).
Jr. Org. Chem., vol. 17, pp. 52–57 (1952).
Organic Chem., Karrer, pp. 98–99 and 289.
Elsevier Pub. Co., N. Y. (1946).
"Organic Chem.," Gilman, vol. I, pp. 189–91, John Wiley and Sons, Inc., N. Y. (1938).